United States Patent [19]

Springer

[11] 4,397,649
[45] Aug. 9, 1983

[54] WATER-SOLUBLE PHTHALOCYANINE SULFONYL CYANAMIDE COMPOUNDS, PROCESS FOR THEIR MANUFACTURE AND THEIR USE AS DYESTUFFS

[75] Inventor: Hartmut Springer, Königstein, Fed. Rep. of Germany

[73] Assignee: Hoechst Aktiengesellschaft, Frankfurt, Fed. Rep. of Germany

[21] Appl. No.: 296,442

[22] Filed: Aug. 26, 1981

Related U.S. Application Data

[63] Continuation of Ser. No. 179,772, Aug. 20, 1980, abandoned.

[30] Foreign Application Priority Data

Aug. 24, 1979 [DE] Fed. Rep. of Germany ....... 2934248

[51] Int. Cl.$^3$ .......................... C09B 47/26; D06P 1/14
[52] U.S. Cl. .......................................... 8/436; 8/543; 8/661; 8/917; 8/918; 8/919; 8/924; 260/245.8; 260/397.7 R; 260/397.7 DS
[58] Field of Search ................. 8/661, 436; 260/314.5, 260/397.7 R, 397.7 DS, 245.8

[56] References Cited

U.S. PATENT DOCUMENTS

| | | | |
|---|---|---|---|
| 2,259,721 | 10/1941 | Anderson et al. | 260/397.7 |
| 2,459,771 | 1/1949 | Fox | 260/242.2 |
| 2,463,793 | 3/1949 | Mosnier | 260/397.7 R |
| 3,461,143 | 8/1969 | Narsund | 260/397.7 |
| 3,711,508 | 1/1973 | Sroll | 260/314.5 |
| 3,842,030 | 10/1974 | Maeda et al. | 260/245.8 |
| 4,213,757 | 7/1980 | Ruske et al. | 8/661 |

FOREIGN PATENT DOCUMENTS

| | | | |
|---|---|---|---|
| 43561 | 1/1982 | European Pat. Off. | 260/245.8 |
| 2462011 | 6/1975 | Fed. Rep. of Germany. | |
| 613781 | 12/1948 | United Kingdom. | |
| 619972 | 3/1949 | United Kingdom. | |
| 796697 | 6/1958 | United Kingdom. | |

*Primary Examiner*—A. Lionel Clingman
*Attorney, Agent, or Firm*—Connolly and Hutz

[57] ABSTRACT

Water-soluble phthalocyanine compounds of the formula

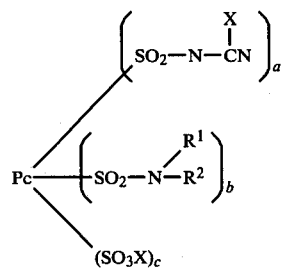

and their salts, wherein Pc is the radical of the metal-free phthalocyanine or of a phthalocyanine containing metals, X means a hydrogen atom, $R^1$ and $R^2$ are a hydrogen atom each or a lower, optionally substituted alkyl group, $R^1$ and $R^2$ being identical or different from one another, or $R^1$ and $R^2$ together with nitrogen atom and an alkylene radical or another heteroatom and two lower alkylene radicals form a heterocyclic ring, a stands for an integer or fractional number of from 1 to 4, b stands for an integer or fractional number from 0 to 3 and c stands for an integer or fractional number from 0 to 3, with a, b and c being identical or different from one another, their sum, however, being from 1 to 4. The novel phthalocyanines can be prepared by reaction of phthalocyanine sulfochlorides optionally containing sulfo-groups with cyanamide or the salts thereof, optionally with another amine of the formula $HNR^1R^2$ with $R^1$ and $R^2$ having the above-mentioned meaning, in an aqueous medium, an organic solvent or a mixture thereof, and in the presence of an acid-binding agent, optionally under simultaneous or subsequent partial hydrolysis of sulfochloride groups to sulfo groups. The new phthalocyanine compounds are suitable as water-soluble dyestuffs for dyeing and printing fiber materials of wool, silk, linear polyamides, leather and materials containing hydroxy groups: they may generally be applied to these materials in a neutral or acidic aqueous medium, and are subsequently, optionally after an intermediate drying, fixed under heat.

3 Claims, No Drawings

WATER-SOLUBLE PHTHALOCYANINE SULFONYL CYANAMIDE COMPOUNDS, PROCESS FOR THEIR MANUFACTURE AND THEIR USE AS DYESTUFFS

This application is a continuation of application Ser. No. 179,772, filed Aug. 20, 1980, now abandoned.

Phthalocyanine dyestuffs which contain sufonamide groups are known, for example, from German Patent Specification No. 696,591. They can be manufactured by reacting phthalocyanine sulfochlorides with ammonia, primary or secondary aliphatic or aromatic amines. Corresponding derivatives with heterocyclic radicals which can be obtained by reaction of phthalocyanine sulfochlorides with heterocyclic amines are also described (see U.S. Pat. No. 2,459,771). If all sulfochloride groups had been converted into sulfonamide groups these phthalocyanine sulfonamides are not soluble in water under neutral conditions and only those are soluble in water, but merely with addition of an alkali, which are derived from ammonia or primary amines. Therefore they can only be applied as dyestuffs from strongly alkaline bath.

Furthermore, more or less water-soluble phthalocyanine sulfonamides suitable for direct dyeing of cellulose-containing materials, are known from German Patent Specification No. 868,035, British Patent Specification No. 1,046,520, German Offenlegungsschrift No. 1,928,677 and U.S. Pat. No. 2,459,773. They can be manufactured by partially reacting phthalocyanine sulfochlorides with ammonia and/or aliphatic amines with simultaneous or subsequent hydrolysis of the non-reacting sulfochloride groups. In general, water solubility of these phthalocyanine sulfonamides, although sufficient for the practice in some cases, must be improved because the number of the solubilizing sulfo groups is necessarily limited.

Now there have been found interesting new phthaloycanine compounds containing sulfonamide groups, which are very easily soluble in water and which can be used as dyestuffs of high quality. They do not have the above described disadvantages and their water solubility does not depend on the existence of sulfo groups.

In acidic form and in the form of their salts the new phthalocyanine compounds have the formula (1)

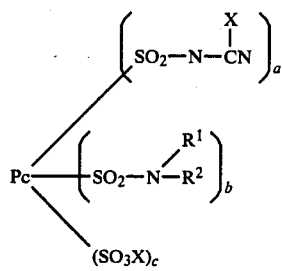

wherein
Pc is the radical of the metal-free phthalocyanine or of a metal complex phthalocyanine, such as of copper, cobalt or nickel phthalocyanine, the phthalocyanine radicals being unsubstituted or additionally substituted in the 3- and/or 4-positions of the carbocyclic aromatic rings or the phthalocyanine, for example by halogen such as chlorine or aryl radicals such as phenyl, and the sulfonyl-cyanamine, sulfonamide and sulfonic acid groups are bound in the 3- and/or 4-positions of the carboxylic aromatic rings of the phthalocyanines;

X is hydrogen or ammonium or the equivalent of a monovalent, bivalent or trivalent metal, preferably of sodium or potassium;

$R^1$ and $R^2$ each is hydrogen or lower alkyl unsubstituted or substituted, or is an aryl radical, $R^1$ and $R^2$ being identical or different from one another; or $R^1$ and $R^2$ form together with the nitrogen atom and an alkylene of 3 to 8 C-atoms, preferably of 4 to 6 C-atoms, or with another heteroatom such as nitrogen or oxygen, and two lower alkylenes a heterocyclic ring, for example the piperidino, piperazino or morpholino ring;

a is an integer or fractional number of from 1 to 4;
b is an integer or fractional number of from zero to 3;
c is an integer or fractional number of from zero to 3;
a, b and c being identical or different from one another, and the sum of (a+b+c) is from 1 to 4.

Also in the case of c being zero, the novel compounds of the formula (1) are acidic compounds, when x is hydrogen, because the amino radical in the sulfonylcyanamide grouping is polarized to the point that the hydrogen atom of the amino group reacts as proton and is easily exchangeable by other salt-forming cations, such as sodium ions, potassium ions and ammonium ions.

The compounds of the general formula (1) are obtained, in general, in the form of mixtures of the single compounds of formula (1) in which mixture the single compounds have different substitution degrees in the radicals marked with the indices a, b and c. Therefore, if constituting the formula of the phthalocyanine product obtained according to the invention, the indices a, b and c are in general fractional numbers.

The indication "lower" used above and below means that the groups so defined contain an alkyl or alkylene of from 1 to 4 C-atoms or consist thereof. The aliphatic radicals and aryl radicals of the formula members $R^1$ and $R^2$ can contain substituents. In the case of alkyls, preferably lower alkyls, the substituents preferably are hydroxy, sulfo, carboxy and phenyl; these alkyls, when substituted, preferably contain 1 or 2 of the substituents. Preferred aryl radicals are phenyl radicals which can be substituted preferably by 1 or 2 substituents from the group of methyl, chlorine, carboxy and sulfo.

The new compounds of the general formula (1) can be prepared according to the invention by reacting, simultaneously or in any order, phthalocyanine sulfonic acid chlorides of the formula (2)

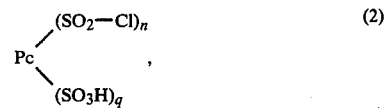

wherein Pc has the above-mentioned meaning and the sulfochloride groups and sulfo groups are bound in the 3- and/or 4-positions of the carboxylic aromatic rings of the phthalocyanine. n is a number from 1 to 4 and q is a number from zero to 3, the sum of (n+q) being from 1 to 4, with cyanamide or with cyanamide and an amine of the formula (3)

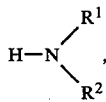

(3)

wherein $R^1$ and $R^2$ have the above-mentioned meanings, in an aqueous medium or in an organic solvent which preferably is miscible with water, or in a mixture of same, at a pH of from 4 to 14, preferably 9 to 14, and at a temperature of from $-10°$ C. to $+110°$ C., preferably between $0°$ C. and $40°$ C., and in the presence of an acid-binding agent, optionally with simultaneous or subsequent partial hydrolysis of the sulfo chloride groups to give sulfo groups. The cyanamide can also be employed in the form of its salts, such as monosodium cyanamide or disodium cyanamide or calcium cyanamide.

Compounds of the general formula (1), wherein the index c is not zero, can also be manufactured according to the process indicated above by modifying it in such a way that part of the sulfochloride groups of the starting compounds of the formula (2) is converted into sulfonic acid groups by hydrolysis before, during or after the condensation reaction(s) of the compounds of formula (2) with cyanamide or cyanamide and the compounds of formula (3). Condensation can be performed, for example, in such a manner that part of the sulfonic acid chloride groups is hydrolyzed simultaneously at the reaction with cyanamide or cyanamide and the amine of formula (3), or the condensation can be carried out by first reacting the compounds of formula (2) with an amount of cyanamide or of cyanamide and the amine of formula (3), which is not sufficient for the complete reaction of all sulfonic acid chloride groups, and by subsequently hydrolyzing the remaining sulfonic acid chloride groups in a separate reaction step in an acidic or alkaline medium, for example at a pH of from 1 to 4 or from 8 to 12, optionally under heat, for example at a temperature of from $20°$ to $60°$ C.

The compounds of the formula (1) are obtained or manufactured as a rule in the form of their salts, preferably in the form of the alkali metal salts, such as the sodium and potassium salts or the ammonium salts, and are used as such for the coloring of fiber materials.

The reaction of the phthalocyanine sulfochlorides of the general formula (2) with cyanamide or with cyanamide and an amine of the formula (3) is preferably carried out in water as reaction medium. But the reaction can also be carried out in an organic solvent, such solvents being preferred which are miscible with water, such as a lower alkanol, for example methanol and ethanol, N-methylpyrrolidine, dimethylformamide and dimethylsulfoxide, or mixtures of such solvents with water.

The reaction of the compounds of the formula (2) with cyanamide and optionally with an amine of the formula (3) is carried out at a temperature from $-10°$ C. to $+110°$ C., advantageously by starting the reaction at a low temperature, for example at a temperature between $-10°$ C. and $+20°$ C., especially between $0°$ C. and $+10°$ C., and completing it, first after partial conversion, by a temperature increase to $20°$ to $50°$ C., or, if necessary, to $110°$ C., preferably to about $100°$ C.

Acid-binding agents which are used in the condensation reaction according to the invention for the manufacture of the compounds of the general formula (1) preferably are alkali metal and alkaline earth metal hydroxides and basic salts of alkali metals and alkaline earth metals of inorganic or organic acids, or tertiary organic bases. Alkali metals are preferably sodium and potassium, and from alkaline earth metals calcium is preferred. Salts which show a basic reaction are preferably alkali metal salts of carbonic acid, of phosphoric acid and acetic acid, such as especially sodium and potassium acetate, sodium and potassium bicarbonate, sodium and potassium carbonate, sodium-dihydrogeno phosphate, disodium-hydrogeno phosphate, trisodium phosphate or their corresponding potassium salts.

Tertiary organic amines are, for example, pyridine, triethanolamine or dimethylaniline or especially pyridine-sulfonic acids or pyridine-carboxylic acids, preferably nicotinic acid.

As starting compounds of the formula (2) there are used, for example, sulfonic acid chlorides or sulfo group-containing sulfonic acid chlorides of the metal-free phthalocyanine, however, preferably those of metal-complex phthalocyanines, such as di-, tri- or tetrasulfonic acid chlorides of copper phthalocyanine, of cobalt phthalocyanine or of nickel phthalocyanine, for example copper-phthalocyanine-(3)-disulfonic acid chloride, copper phthalocyanine-(3)-trisulfonic acid chloride, copper- or nickel phthalocyanine-(3)-tetrasulfonic acid chloride, cobalt phthalocyanine-(3)-trisulfonic acid chloride, copper phthalocyanine-(4)-disulfonic acid chloride or copper phthalocyanine-(4)-tetrasulfonic acid chloride, copper phthalocyanine-(3)-disulfonic acid chloride-disulfonic acid, copper phthalocyanine-(3)-trisulfonic acid chloride-monosulfonic acid, furthermore the analogous sulfonic acid chlorides which contain additionally other substituents, such as phenyl radicals and halogen atoms, at the phthaloycanine nucleus, as for example sulfonic acid chlorides of tetraphenyl-copper phthalocyanine or of tetrachloro-nickel phthalocyanine. The sulfonic acid chlorides of the formula (2) are prepared according to known processes, for example in accordance with the process of German Patent Specification No. 891,121.

Amines of the general formula (3) are, for example: ammonia, methylamine, ethylamine, n-butylamine, benzylamine, aniline, ethanolamine, dimethylamine, diethylamine, diisopropylamine, N-methylbenzylamine, N-methylaniline, piperidine, morpholine, diethanolamine, 2-amino-ethane-1-sulfonic acid, 2-aminoethane-1-carboxylic acid, 4-aminobenzene-carboxylic acid, 3-aminobenzene-sulfonic acid or 4-amino-benzene-sulfonic acid.

The isolation of the phthalocyanine compounds obtained according to the process described above is effected in usual manner by salting out, for example with sodium, potassium or ammonium chloride, and/or by acidifying with a mineral acid or by evaporating their neutral or slightly acid aqueous solutions, preferably at a moderately elevated temperature and reduced pressure, Thus, the phthalocyanine compounds of the invention are obtained in the form of their sodium, potassium or ammonium salt or in the form of their acids or in a mixture of these forms.

The novel phthalocyanine compounds of formula (1) are suitable as dyestuffs for the dyeing and printing fiber materials made of wool, silk, linear polyamides, but especially of hydroxy group-containing materials, such as cellulose, for example linen, regenerated cellulose and above all cotton, furthermore paper and leather. They are preferably used as dyestuffs in the form of their ammonium salts. The dyeings are prepared in common manner in the neutral or acidic pH range using heat as fixing medium, for example by direct dyeing from a dye bath which optionally contains neutral inorganic alts, for example an alkali metal chloride or alkali metal sulfate, at room temperature or at elevated temperature, for example in the range of from about 40° to 100° C., and, optionally after an intermediate drying, by a subsequent fixation at a temperature of above 95° C.

Compounds of the general formula (1)—hereinafter called dyestuffs—which show a minor affinity to the fiber are advantageously applied on the material to be colored in that manner that the fiber material is impregnated (paddied) by means of an aqueous solution of said dyestuff, optionally containing neutral inorganic salts, in the cold or at a moderate temperature, which is then squeezed off, and the dyestuff thus applied is than fixed as mentioned above, optionally after an intermediate drying of the impregnated material.

Fixation takes place at a temperature between 95° and 220° C.; the temperature used may depend on the material if said material is sensitive to very high temperatures or hot dry air. Fixation is preferably carried out with steam of a temperature between 100° and 160° C. or with dry air (heat setting) of a temperature between 150° and 220° C.; heat setting is preferably used for cellulose fiber materials.

In textile printing the dyestuffs according to the invention are dissolved in water, optionally while adding common auxiliary agents, such as urea or a dispersing agent, and are stirred together with a thickening agent, such as methyl cellulose or an alginate thickener. The goods are printed in common manner with the pastes thus obtained. Fixation is then effected by steaming or thermosetting in the known manner, as mentioned above.

The dyestuffs of the invention yield on the above-mentioned materials very valuable full dyeings and prints which are marked by very good fastnesses to wetting and to light.

The following Examples serve to illustrate the invention. The parts are parts by weight, and the percentages are percent by weight, unless otherwise stated. The parts by weight are to the parts by volume as the kilogram is to the liter. The radicals of the formula CuPc, NiPc and CoPc means the unsubstituted copper, nickel or cobalt phthalocyanine radical.

EXAMPLE 1

While stirring thoroughly, 97 parts of copper phthalocyanine-(3)-tetrasulfochloride are introduced in the form of a moist filter cake into a solution of 21 parts of cyanamide and 20 parts of sodium hydroxide in 700 parts of water. The reaction starts with slight development of heat and the temperature of the reaction mixture increases to about 30° C. By continuously adding dropwise about 155 parts by volume of an aqueous sodium hydroxide solution to the mixture, the pH of the reaction mixture is maintained at 10. The reaction is complete after about 6 hours which can be stated by the fact that no sodium hydroxide solution is consumed any longer; a clear solution has been formed. The pH of the solution is adjusted to neural with the aid of hydrochloric acid, and the solution is evaporated to dryness at reduced pressure. There are obtained 143 parts of a turquoise salt-containing dyestuff powder which contains 75% of the sodium salt of the compound of the formula $CuPc-(SO_2-NH-CN)_4$ as dyestuff.

The compound of the formula $CuPc-(SO_2-NH-CN)_4$ can be obtained in this acidic form acidifying the aqueous solution of the above-mentioned sodium salt with hydrochloric acid, filtering off the precipitated acid-containing dyestuff, washing it thoroughly with dilute aqueous hydrochloric acid and drying it under reduced pressure.

The ammonium salt can be prepared from the acid dyestuff by dissolving the acid dyestuff in water with addition of aqueous ammonia solution until neutral reaction and by evaporating the solution to dryness under reduced pressure.

Application 30 parts of the ammonium salt of the compound of the formula $CuPc-(SO_2-NH-CN)_4$ are dissolved in 1,000 parts of water, and a wetting agent common in cotton dyeing is added to this dye bath in which a cotton cloth is treated for one hour at 95° C. at a goods-to-liquor ratio of 1:20. Subsequently, the cloth is taken from the bath, squeezed off, dried and subjected to heat-setting for 2 minutes at 210° C., then rinsed with cold and hot water and finally with a boiling weak soap solution, with water again and dried. A turquoise dyeing with a good fastness to washing and very good fastness to light is obtained.

EXAMPLE 1a

The manufacture of a dyestuff according to the invention is carried out as described in Example 1, but instead of the copper phthalocyanine-(3)-tetrasulfochloride another metal-free or metal-containing phthalocyanine sulfochlororide is used, for example copper phthalocyanine-(4)-tetrasulfochloride, nickel phthalocyanine-(3)-tetrasulfochloride, cobalt phthalocyanine-(3)-tetrasulfochloride, copper phthalocyanine-(3)-trisulfochloride, copper phthalocyanine-(3)-disulfochloride or phthalocyanine-(3)-tetrasulfochloride. There are also obtained dyestuffs which, according to the operation of Example 1, are applied to cellulose fibers and subjected to heat setting and yield turquoise dyeings with good fastness properties.

EXAMPLE 2

While stirring thoroughly, 97 parts of copper phthalocyanine-(3)-tetrasulfochloride are introduced in the form of a moist filter cake into a solution of 8.4 parts of cyanamide and 8.0 parts of sodium hydroxide in 300 parts of water. The pH of the reaction mixture is reduced by the starting reaction. It is maintained at 10 by continuously adding aqueous 2 N-sodium hydroxide solution and the reaction mixture is stirred until no alkali metal hydroxide is consumed any longer; about 310 parts by volume of the aqueous 2 N-sodium hydroxide solution are necessary for this reaction. A dark blue solution is obtained. For isolating the dyestuff obtained the batch is acidified with 70 parts of concentrated hydrochloric acid and salted out with 200 parts of ammonium chloride. The precipitate is filtered off, thoroughly washed with dilute hydrochloric acid and drid under reduced pressure. There are obtained 96 parts of a dyestuff powder with a dyestuff content of 98%. The dyestuff compound obtained, in the form of a free acid, has the following structure:

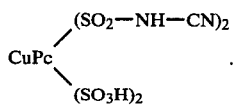

The compound obtained is diluted in 1,200 parts of water with addition of 27 parts of a 25% aqueous ammonia solution, and the dyestuff solution obtained is evaporated to dryness under reduced pressure.

102 Parts of the ammonium salt of the above-mentioned phthalocyanine compound according to the formula

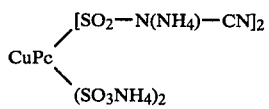

are obtained.

Application

15 Parts of this ammonium salt are dissolved in 200 parts of hot water together with 20 parts of urea. To the intensely turquoise solution there are added with stirring 400 parts of a 4% aqueous sodium alginate thickening. The printing paste so obtained is brought to 1.000 parts by adding water and thickening. A cotton fabric is printed with the printing paste so obtained, dried and then subjected to thermofixation for 2 minutes at 210° C.; subsequently it is rinsed with cold and hot water, washed with a boiling soap solution, rinsed again with water, and dried. A full turquoise printing pattern with a good light fastness and a very good fastness to washing is obtained.

EXAMPLE 3

While stirring thoroughly 97 parts of copper phthalocyanine-(3)-tetrasulfochloride are introduced in the form of a moist filter cake into a solution of 8.4 parts of cyanamide and 8.0 parts of sodium hydroxide in 500 parts of water. In the course of the starting reaction the pH of the reaction mixture decreases, and it is maintained at 10 by adding dropwise an aqueous 2 N-sodium hydroxide solution. Immediately after 100 parts by volume of the aqueous sodium hydroxide solution are consumed, addition of the sodium hydroxide solution is stopped and the pH is maintained at 10 by adding dropwise an aqueous 2 N-ammonia solution.

The reaction being complete, the dyestuff obtained is precipitated by acidification with hydrochloric acid, filtered off, thoroughly washed with dilute hydrochloric acid and dried under reduced pressure. 90 Parts of a dark blue dyestuff powder are obtained consisting of the compound of the formula

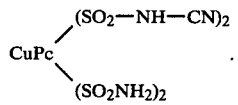

This dyestuff can be converted to its ammonium salt by the method described in Example 2. According to the operations of Example 2, turquoise cotton prints of good fastnesses to light and washing are likewise obtained with this dyestuff.

EXAMPLE 3a

When the preparation of a compound according to the invention is carried out in the manner described in Example 3, while, however, using instead of aqueous ammonia an aqueous solution with the equivalent amount of another primary or secondary aliphatic or aromatic amine, for example methylamine, ethylamine, n-butylamine, benzylamine, aniline, ethanolamine, dimethylamine, diethylamine, diisopropylamine, N-methylbenzylamine, N-methylaniline, piperidine, morpholine, 2-amino-1-carboxylic acid, 2-amino-ethane-1-sulfonic acid, 4-aminobenzene-benzoic acid, 3-aminobenzene-sulfonic acid or 4-aminobenzene-sulfonic acid, and the condensation reaction is carried out at a pH between 5 and 8.5 depending on the basicity of the amine used, dyestuffs according to the general formula (1) are obtained which are well suitable for the preparation of greenish blue to turquoise blue dyeings on cellulose fiber material with good fastnesses to washing and light.

EXAMPLE 4

The manufacture of a dyestuff according to the invention is carried out in the manner described in Example 3, but, instead of the sodium hydroxide solution as an acid-binding agent an aqueous ammonia solution is added dropwise immediately at the beginning of the condensation reaction while keeping to pH at 10 during the reaction. A dyestuff is obtained which, in the form of a free acid, has the formula

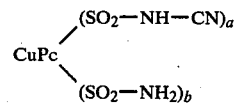

wherein
a is less than 2,
b is more than 2,
and the sum a+b is 4.

This dyestuff is a little more difficulty soluble in water than the dyestuff of Example 3. According to the application and fixation method of Example 1 it can be fixed on cotton fiber material yielding turquoise dyeings with very good fastness properties.

EXAMPLE 5

97 Parts of copper phthalocyanine-(3)-tetrasulfochloride are added to a solution of 42 parts of cyanamide and 80 parts of sodium hydroxide in 1,000 parts of water at room temperature, while stirring thoroughly. Within a short time the temperature increases to about 30° C.; a dark blue solution is formed. The reaction being complete, the dyestuff obtained is precipitated by addition of hydrochloric acid or aqueous sulfuric acid, filtered off, thoroughly washed with dilute hydrochloric acid and dried under reduced pressure. 92 Parts of the compound of the formula $CuPc(SO_2-NH-CN)_4$ with similar dyeing properties as the dyestuff of Example 1 is obtained.

EXAMPLE 6

50 Parts of sodium hydrogenocarbonate are added to a solution of 25.8 parts of cyanamide in 250 parts by volume of N-methyl-pyrrolidone. The total batch is cooled to 5° C., and subsequently 97 parts of copper phthalocyanine-(3)-tetrasulfochloride are added in the form of a moist filter cake during about 1 hour without exceeding a temperature of 10° C. while stirring thoroughly. Stirring is continued for some hours at 10° C. and subsequently for 12 hours at room temperature. The dyestuff salt obtained is precipitated completely by addition of n-butanol, filtered off and washed with butanol and ethanol. In order to convert the compound obtained to its acid form and to remove adhering salt, the dyestuff product is stirred with dilute hydrochloric acid, filtered off, thoroughly washed with dilute hydrochloric acid, and dried at reduced pressure. The yield is 94 parts of the compound of the formula CuPc-$(SO_2-NH-CN)_4$; this dyestuff corresponds in its properties, especially in the form of the alkali metal salt, preferably the ammonium salt, to the dyestuff manufactured according to Example 1.

EXAMPLE 7

63.5 Parts of calcium cyanamide (33% relative to cyanamide, molecular weight 42) are stirred with 450 parts of water; 97 parts of copper phthalocyanine-(3)-tetrasulfochloride are introduced into the suspension obtained in the form of a moist filter cake. The reaction starts with weak development of heat, and the temperature of the reaction mixture is maintained below 30° C. by cooling. After about 1 hour the reaction is complete; a dark blue solution containing a small portion of undissolved by-products is obtained. A solution of 90 parts of ammonium carbonate in 400 parts of water is added, after short stirring the batch is filtered off from the precipitated calcium carbonate and the filtrate is evaporated to dryness under reduced pressure. 128 Parts of a salt-containing blue dyestuff, containing 83% of the ammonium salt of the compound of the formula CuPc—$(SO_2-NH-CN)_4$ is obtained.

What is claimed is:

1. A water-soluble phthalocyanine compound of the formula (1)

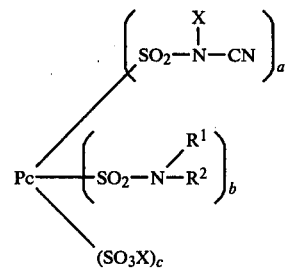

wherein
Pc is the radical of the metal-free or a metal-complex phthalocyanine, said phthalocyanine radicals are unsubstituted or additionally substituted in the 3- and/or 4-positions of the carbocyclic aromatic rings of the phthalocyanine, and the sulfonylcyanamide, sulfonamide and sulfonic acid groups are bound in the 3- and/or 4-positions of the carbocylic aromatic rings of the phthalocyanines;
X is hydrogen, sodium, potassium or ammonium;
$R^1$ and $R^2$ each is hydrogen or lower alkyl unsubstituted or substituted or is an aryl radical, $R^1$ and $R^2$ being identical or different from one another; or
$R^1$ and $R^2$ form together with the nitrogen atom and an alkylene of 3 to 8 C-atoms, or with another heteroatom and two lower alkylenes a heterocyclic ring;
a is an integer or fractional number from 1 to 4;
b is an integer or fractional number from zero to 3;
c is an integer or fractional number from zero to 3;
with a, b and c being identical or different from one another, but the sum of (a+b+c) is from 1 to 4, and the salts of these compounds.

2. A compound of the formula (1) according to claim 1, wherein X is sodium, potassium or ammonium.

3. A process for coloring a fiber-material containing or made of wool, silk or linear polyamides, or a hydroxy groups containing material or leather which comprises applying a compound of formula (1) defined in claim 1, onto said material and fixing it on said material under the action of heat.

* * * * *